United States Patent Office 3,351,220
Patented Nov. 7, 1967

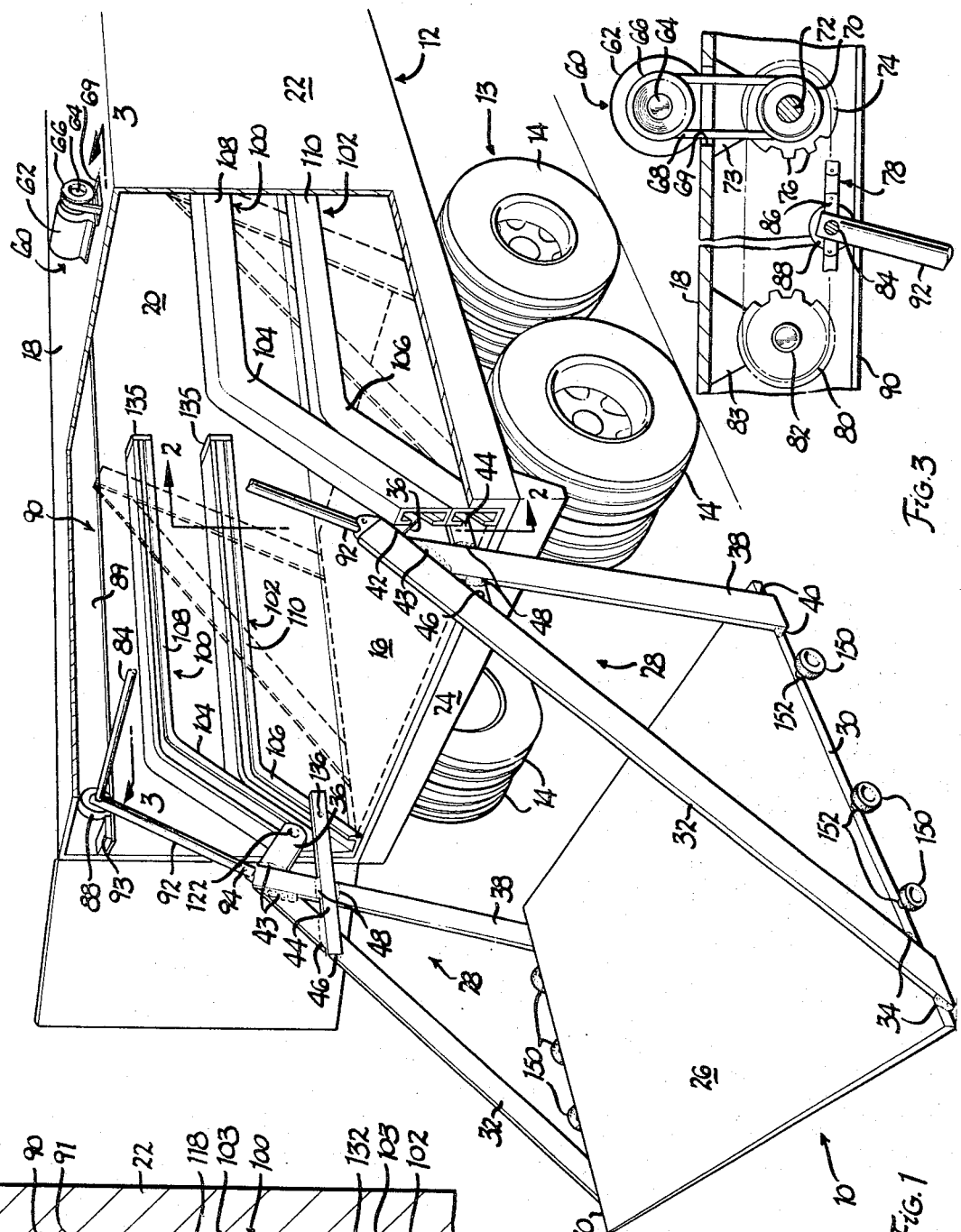

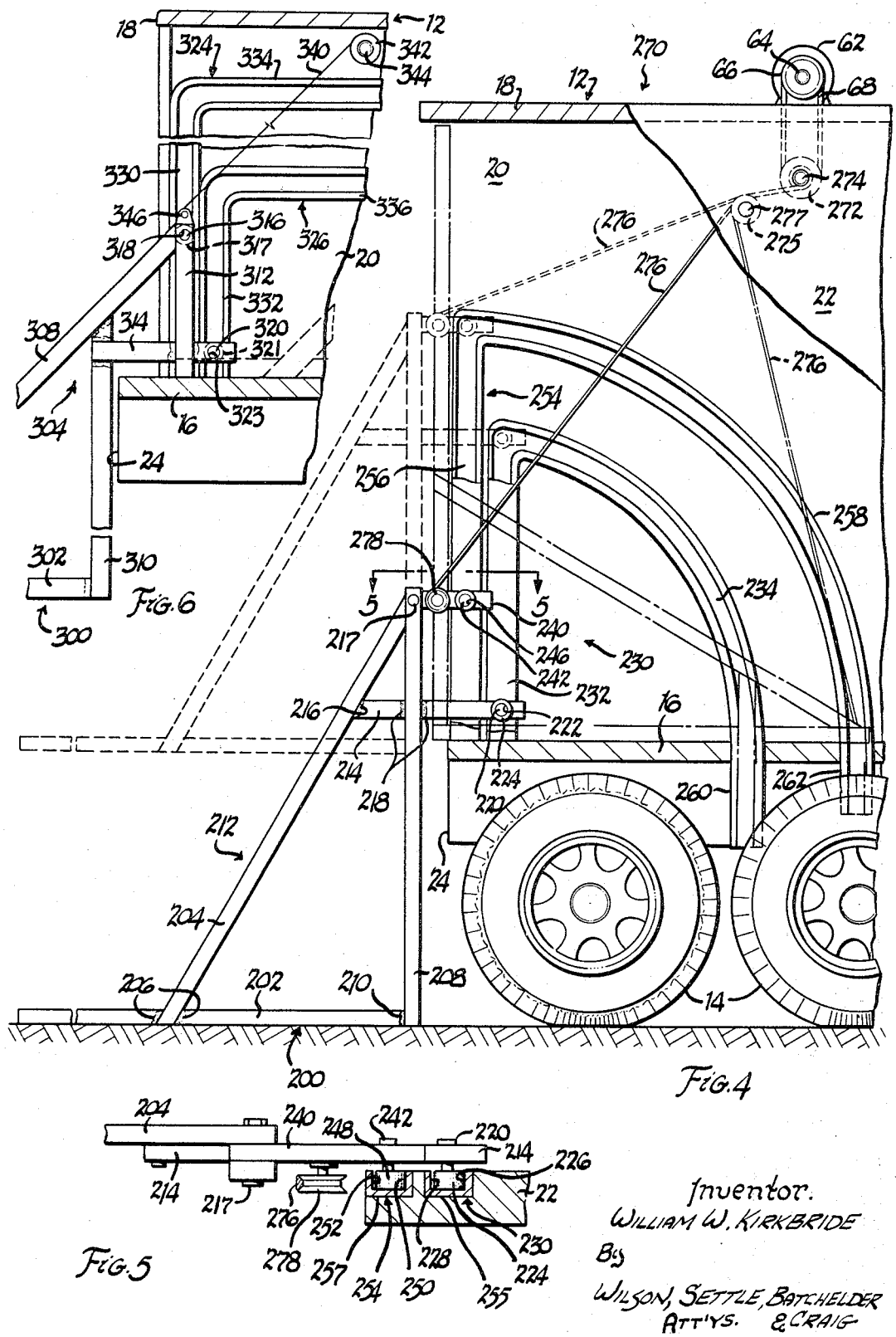

3,351,220
POWER ELEVATOR SYSTEM
William W. Kirkbride, 14198 Syracuse,
Taylor, Mich. 48180
Filed July 21, 1965, Ser. No. 473,757
4 Claims. (Cl. 214—75)

The present invention relates generally to a power elevator system for trucks and trailers and more specifically such a system, including a unique method and a novel apparatus, for power loading and unloading freight cargo into and out of the truck or the trailer. The present invention features a power elevator system which moves between a ground-engaging position and a position within the interior of the truck box or the trailer in such a way as to uniquely avoid interference with the rear axle of the truck or trailer regardless of its placement. Thus, this invention fully accommodates use of spread and sliding tandems. Also, the entire elevator apparatus of this invention is adapted to be retracted into the truck box or the trailer, either horizontally or vertically, during transport so that dock damage to the apparatus is substantially alleviated.

For purposes of simplicity and clarity the following specification is directed primarily toward the present inventive power elevator system utilized on a semi-trailer. However, it is to be understood that this invention is not exclusively restricted in scope to semi-trailers, but is equally applicable to trucks with an integral box, with or without a top, panel trucks, trailers of all sizes, and the like.

The trucking industry has experienced, in recent years, many difficult problems with respect to trailer power lift elevators, including power lift gates. Because of recent freight-handling automation by wholesale grocery suppliers and by other wholesalers and retailers, several of these power lift elevator problems, particularly at warehouses and the like, have been severely accentuated. For example, improved methods for automatic handling of freight at loading and unloading stations have made many trailer lift elevators obsolete and have resulted in a searching demand for a trailer lift elevator system capable, inter alia, of mass loading freight in a relatively brief time without interference with the rear axle of the vehicle. The present invention provides such a lift elevator system.

Moreover, dock damage to prior art lift elevators caused by backing the trailers into loading docks is an additional longstanding problem in the art. This problem is substantially alleviated by this invention.

Accordingly, it is a primary object of the present invention to provide a novel power lift elevator system, including method and apparatus, to be used in conjunction with trucks, trailers, semi-trailers and the like.

Another object of the present invention is the provision of a novel power lift elevator system of the type previously described, the elevator platform of which is adapted to be fully retracted into the interior of the trailer or the truck box, either vertically or horizontally, so that, among other things, dock damage to the elevator system is substantially alleviated.

An additional important object of this invention is the provision of a unique power lift elevator system of the type described, the operation of which does not at any time interfere with the position occupied by the rear axle and rear wheels of the vehicle even when such axle and wheels are placed in close proximity to the rear edge of the vehicle.

It is an important object of this invention to provide a power lift elevator system of the type described which has an increased load capacity per unit of time coupled with a decreased power requirement.

Another and no less important object of the present invention resides in the provision of a unique trailer elevator system, including method and apparatus, which can be mass produced and which accommodates ready, rapid installation thereof on all existing types of trucks, trailers, semi-trailers, and the like, without requiring a major modification to either the system or the vehicle upon which it is mounted.

It is an important object of this invention to provide a novel power lift system having one or more of the following important features: (1) minimizes weather damage; (2) lifts the elevator platform from above rather than beneath the platform; (3) imposes part or all of the load of the freight exerted upon the elevator platform upon cam tracks through cam followers during at least a portion of the loading and the unloading operations, the cam tracks being mounted at the interior of the sidewalls of the vehicle; (4) accommodates retention of the last elevator load of freight upon the elevator platform within the freight-containing portion of the vehicle during the transport; (5) accommodates loading of the freight directly into the freight-receiving portion of the vehicle in addition to lifting the freight from a ground level to the vehicle floor level and vice versa, and (6) with which floor-engaging rollers can be used to transfer the cargo load from the platform to the vehicle floor as the platform is shifted in a horizontal attitude from without to within the vehicle.

These and other objects and features of this invention will become more fully apparent from the appended claims as the ensuing detailed description proceeds in conjunction with the accompanying drawings in which:

FIGURE 1 is a schematic perspective representation of a presently preferred elevator lift apparatus as installed upon a conventional semi-trailer;

FIGURE 2 is a fragmentary schematic cross sectional view taken along line 2—2;

FIGURE 3 is a fragmentary schematic cross sectional view taken along line 3—3 of FIGURE 1;

FIGURE 4 is a fragmentary schematic side elevational view, partly broken away from purposes of clarity, illustrating a second presently preferred lift elevator apparatus of the present invention installed upon a conventional truck-trailer;

FIGURE 5 is a fragmentary schematic cross sectional view taken along line 5—5 of FIGURE 4; and FIGURE 6 is a fragmentary schematic side elevational view, partly broken away, illustrating a third presently preferred embodiment of the present invention.

Reference is now made to the drawings wherein like numerals are used to designate like parts throughout. Briefly, FIGURE 1 is a schematic perspective of one presently preferred slant power lift or elevator system, generally designated 10, as installed upon a conventional semi-trailer, generally designated 12.

Briefly, the conventional semi-trailer 12 is provided with a rear tandem 13 comprising a suitable number of axle-mounted wheels 14. The semi-trailer 12 comprises a floor 16, a top 18 and left and right sidewalls 20 and 22, respectively. A dock bumper 24 depends from the floor 16 at the extreme rearward end of the trailer 12, being secured thereto by any suitable means, such as by welding.

The slant power lift elevator apparatus 10 comprises a freight-receiving platform 26 rigidly secured to a rigid frame, generally designated 28, by suitable means, preferably by having been welded to the lateral edges 30 of the platform 26.

Inasmuch as the left hand rigid frame 28 is identical, though opposite hand, to the right hand rigid frame 28 only one rigid frame will be described. While any suitable rigid frame may be used, the rigid frame 28 of FIGURE 1 is depicted as comprising a diagonal strut 32 rigidly secured to the platform 26 as previously mentioned, preferably by welding, as schematically depicted at 34 in FIGURE 1.

The diagonal strut 32 is rigidly joined to an angularly disposed, downwardly projecting arm 36 integrally disposed at its upper end by welding at 42 or the like. The rigid frame 28 also comprises a substantially vertically extending strut 38 suitably rigidly secured to the platform 26 by welding at 40 or the like. The strut 38 is also rigidly joined to the diagonal strut 32 and to the arm 36 by welding at 43.

The rigid frame 28 also includes a substantially horizontally extending strut 44 rigidly secured by welding at 46 and 48 respectively to the diagonal strut 32 and the essentially vertically extending strut 38. Thus, the frame 28 is rigid and the components thereof are non-rotatably secured one to another.

The power lift elevator apparatus 10 of FIGURE 1 is displaced between three distinct positions by operation of a drive apparatus, generally designated 60 and depicted in enlarged elevation in FIGURE 3. The three distinct positions mentioned are a ground engaging position as depicted in FIGURE 1, a position immediately behind and at the approximate elevation of the floor of the trailer (not shown in FIGURE 1) and a position completely within the trailer, which position is illustrated in dotted lines in FIGURE 1.

The drive apparatus 60 as seen in FIGURES 1 and 3 comprises a reversible motor 62, of suitable type, equipped with a drive shaft 64 which is non-rotatably secured to a pulley 66 at one end of the shaft. When the motor 62 is energized, the shaft 64 and the pulley 66 are caused to rotate. The rotation of the pulley 66 displaces a V-belt 68 which contiguously engages the drive surface of the pulley 66 through essentially the upper 180 arcuate degrees thereof. Likewise, the V-belt 68, as seen in FIGURE 3, passes through an aperture 69 in the trailer top 18 and around the lower essentially 180 arcuate degrees of the drive surface of a second pulley 70. The pulley 70 is non-rotatably secured by suitable means, such as a spline connection, to a shaft 72, the shaft 72 being suitably rotatably secured to the truck trailer 12 by suspended bracket supports 73 or the like. They may be provided with a manual crank, with or without reduction gears interposed therebetween, to accommodate operation of the lift unit 10 in the event of motor failure or in the event that motor 62 is electric and no source of power is immediately available.

A chain gear 74 is also non-rotatably secured to the shaft 72, being equipped with gear teeth 76 which serially engage the individual links of an endless drive chain 78 during rotation. The endless drive chain 78 also passes around a second chain gear 80 which is non-rotatably carried upon a shaft 82 a predetermined distance to the rear but preferably in alignment with the shaft 72. The shaft 82 is also suitably rotatably carried by the truck trailer 12 by a suspending bracket support 83 or the like. Alternatively, a cable drive or belt drive could be used in place of the endless chain drive.

A cross bar 84 is pivotally carried by a link 86 of the chain drive, the cross bar 84 extending essentially across the lateral distance of the semi-trailer, as illustrated fragmentarily in FIGURE 1. A roller or wheel 88 is rotatably secured at each end of the cross bar 84, each wheel engaging a track surface 89 of a guide rail 90 to accommodate fore and aft rectilinear displacement of the cross shaft and the rollers along the path defined by the surfaces 89 of the two identical guide rails 90. The rails 90 are secured to the sidewalls 20 and 22 by suitable means, such as spaced countersunk screws 91, and are preferably provided with fore and aft stops 93, to prevent derailment of the rollers. A drawbar 92 is also rotatably carried by the crossbar 84 inwardly adjacent each roller or wheel 88. Each drawbar 92 is also pivotally supported at 94, in any suitable manner, to the rigid frame 28.

Thus, the drive apparatus 60 provides the power for displacing the lift unit 10, but does not in any way define the path through which the lift apparatus 10 is displaced.

A predetermined amount of counterclockwise rotation of the motor 62, as viewed in FIGURES 1 and 3, will thus operate the endless drive chain to displace the lift unit 10 from its ground engaging position, depicted in FIGURE 1, to the position immediately behind and at essentially the same elevation as the trailer floor 16, at which time the motor 62 may be deenergized and the lift unit 10 retained in position by suitable brake means (not shown). Continued counterclockwise rotation of the motor 62 results in providing the impetus necessary to further displace the lift unit 10 to a position completely within the interior of the trailer 12, this position being depicted in dotted lines in FIGURE 1 as previously mentioned.

It is to be appreciated that the drive apparatus 60 and apurtenances thereto, in combination, are only one type of drive which can be used with the present invention. Other types of mechanical, hydraulic, electric, power take-off and like drives may be used. Moreover, it is not necessary that the drive unit used be located at the top of the trailer.

With continued reference to FIGURE 1, the present invention novelly provides a guide or cam system which completely defines the path traversed by the lift unit 10 as it is displaced between the ground engaging position and the position interior of the trailer 12.

This novel path-defining or guide system comprises a pair of cam tracks 100 and 102 rigidly secured to the respective sidewalls 20 and 22 by any suitable means such as countersunk screws 103. In the embodiment of FIGURES 1 and 2, the cam tracks 100 and 102 are substantially identical in configuration, each defining a slanted path respectively at 104 and 106 at the rear of the trailer 12 and a straight, essentially horizontal path at 108 and 110 repectively. More specifically, the cam track 100 comprises, along both sections 104 and 108, and interior cam surface 112 (see FIGURE 2) of suitable configuration and co-extensive though oppositely directed integral flanges 114 and 116 which function to confine a roller or cam follower 118 against lateral derailment at the cam track 100. The cam follower 118 is suitably rotatably secured to a short shaft 120, which shaft is non-rotatably secured at 122, preferably by threaded connection, to the forwardly and downwardly extending arm 36 of the rigid frame 28. The threaded connection accommodates a small amount of lateral adjustment to assure that it can be properly located on the cam surface 112.

Similarly, the cam track 102 comprises, along both sections 106 and 110, an interior cam surface 126 (see FIGURE 2) and co-extensive though oppositely directed integral flanges 128 and 130 which function to confine a roller or cam follower 132 against lateral derailment at the cam track 102. The cam follower 132 is rotatably secured to a short shaft 134, which shaft is non-rotatably secured at 136, preferably by threaded connection, to the essentially horizontal strut 44 at the forward end thereof. The threaded connection accommodates appropriate lateral adjustment of the cam follower 132 upon the cam surface 126.

Stop members 135 may be provided at front and/or rear of each cam track 100 and 102 to prevent inadvertent fore and aft derailment.

While the cam tracks 100 and 102 are shown as extending only part way into the interior of the trailer 12, it is to be appreciated that each cam track may extend into the trailer any distance desired.

Thus, by appropriate utilization of the unique path defining or guide system (comprising the cam rollers 118 and 132 and the cam tracks 100 and 102), the power lift elevator unit 10 is conveniently displaced between the three previously mentioned positions, the cam surfaces 112 and 126 being appropriately configured to define fully the path traversed by the lift elevator unit 10 between the ground-engaging position and the position completely within the interior of the trailer 12. In this relative uncomplex way, interference with the rear trailer axle or tandem is avoided regardless of the location thereof. Moreover, the freight-receiving platform 26 of the elevator apparatus 10, by reason of being displaceable to a position fully within the interior of the trailer 12, is capable of retaining the last platform load of freight upon the platform within the interior of the trailer during transport from a loading to an unloading station. Thus, the elevator apparatus 10, being completely retracted into the trailer, substantially eliminates the danger of dock damage to the elevator unit. Costly dock damage is often inflicted upon prior art lift units due to the fact that exposed portions of these lift units are brought into striking contact with loading docks as the trailer or trucks are backing into docks for loading or unloading operations.

Furthermore, preliminary evaluations reveal that the present power lift elevator system has increased load capacity per unit of time and requires less power to operate per unit of time. Moreover, the present lift system is not complex and can be fabricated relatively easy. This accommodates ready and rapid installation of the system on all existing trucks, trailers, semi-trailers and the like without the requirement of major modification to either the trailer or to the lift system.

During operation, by reason of the angular relation of cam portions 104 and 106 with respect to the vertical, part of the freight load is transferred through the rollers 118 and 132 to the cam tracks 100 and 102 when the rollers are so located. Also, the lift elevator unit 10 is displaced upon the cam tracks 100 and 102 along the cam portions 108 and 110 part or all of the load exerted by the freight on the platform 26 is transferred through the rollers 118 and 132 to the cam track 100 and 102, respectively. As an alternative or as a supplement, floor-engaging rollers 150 (FIGURE 1), each rotatably mounted upon a short shaft 152, the shaft being non-rotatably secured to the platform 26 at the edge 30 or at the bottom by suitable means, preferably by welding, may be used to transfer all or part of the freight load to the trailer-floor 16, as the platform 26 is displaced into the interior of the trailer 12.

Reference is now made to FIGURES 4 and 5 which fragmentarily depict a second presently preferred lift elevator unit, generally designated 200. The lift elevator unit 200 is installed upon a conventional semi-trailer, the components of which, for simplicity, are designated with numerals corresponding to those utilized in FIGURE 1.

The lift elevator unit 200 comprises a freight receiving platform 202 to which a diagonal strut 204 is non-rotatably secured at 206 by suitable means, such as by welding, and an essentially vertically extending strut 208 non-rotatably secured preferably by welding at 210 to the platform 202. The diagonal strut 204 and the essentially vertically extending strut 208 comprise a rigid frame 212, one such frame being disposed at each transverse edge of the freight-receiving platform 202. Each rigid frame 212 also includes an essentially horizontally extending strut 214, which strut is non-rotatably secured, preferably by welding at 216 and 218, to the diagonal member 204 and the vertical member 208, respectively. The forward end of the horizontal strut 214 non-rotatably carries an adjustable short shaft 220, for example by a threaded connection at 222. A cam follower or roller 224 is rotatably carried at the outward end of the shaft 220. The cam follower or roller 224 engages one of the two cam surfaces 226 and 228 (FIGURE 5) of a cam track generally designated 230, depending on the balance of forces exerted upon the lift unit 200.

The diagonal strut 204 terminates at its upper, forward end in an essentially horizontally extending arm 240 the forward end of which non-rotatably carries an adjustable short shaft 242, for example by threaded connection at 246. The arm 240 and the strut 204 are joined by a bolt 217, or by other suitable fastening means. The outward end of each short shaft 242 rotatably carries a roller or cam follower 248 which engages one of the two cam surfaces 250 and 252 of a second cam track, generally designated 254.

As can be seen from FIGURE 5, the cam tracks 230 and 254 are situated within recesses 255 and 257, which are appropriately situated within each of the trailer sidewalls, only the sidewall 20 being fragmentarily illustrated in FIGURE 5.

As seen in FIGURE 4, the cam track 230 comprises an essentially vertically extending portion 232 and an arcuate portion 234, which in combination, define the complete path traversed by the lift elevator unit 200 between the ground engaging position shown in solid lines in FIGURE 4, the vertically elevated position shown in dotted lines in FIGURE 4 and the arcuately rotated position shown in phantom lines in FIGURE 4. In the latter position, the platform 202 functions as a closure or door for the rear opening of the trailer 12. Hence, no rear doors are necessary with this embodiment. Of course, the freight contained upon the platform 202 would necessarily have to be unloaded when the platform was situated in the position depicted in the dotted lines in FIGURE 4 before the platform could be properly rotated into its essentially vertically extending position shown in phantom lines of FIGURE 4.

As can be seen by inspection of FIGURE 4, the configuration of the cam track 254 parallels that of 230 having an essentially vertically extending portion 256 and an arcuate portion 258 to accommodate the three positional movements previously described. In order to situate the unit 200 in the position shown in phantom lines of FIGURE 4, two cam track extensions 260 and 262 are respectively located at the forward terminal ends of the cam tracks 230 and 254. These extensions depend linearly downward through the trailer floor 16 away from interference with the rear wheels, axles and the like, the extensions being secured to the trailer-floor in any suitable manner, such as by welding.

While the cam tracks 230 and 254 define precisely the complete path traversed by the lift unit 200, the power for displacing the apparatus 200 through the three previously mentioned positions is provided by a drive apparatus, schematically illustrated in FIGURE 4 and generally designated 270.

The drive apparatus 270 comprises a reversible motor 62, of any suitable type, equipped with a drive shaft 64 non-rotatably secured to a pulley 66 which turns a V-belt 68 which belt passes through an aperture (not shown in FIGURE 4) in the top 18 of the trailer 12, as previously explained in conjunction with the embodiment of FIGURES 1–3. A second pulley 272, around which the V-belt 68 passes, is non-rotatably secured to a cross-shaft 274 which is rotatably secured, in any suitable manner, to the trailer 12. Thus, as the motor 62 of FIGURE 4 is driven in one direction or the other the shaft 274 functions as a cable drum feeding out or drawing in the cable 276 to lift, drop or pivot the lift apparatus 200, as desired. The cable 276 has one end secured at the shaft 274 in a suitable way and the other end secured to a suitable retaining means 278 located at the arm 240 of the rigid frame 212, the central portion of the cable passing over a guide pulley 275.

Thus, assuming the lift apparatus 200 to be positioned in its ground engaging position as depicted in solid lines in FIGURE 4, counterclockwise rotation of the reversible motor 62 will cause the cable to be wrapped about the shaft 274 after it passes about the pulley 275 (which is rotatably secured to a shaft 277 non-rotatably carried by one or both of the trailer sidewalls). This exerts an upward and inward lifting force upon the unit 200 through the cable 276 which draws the unit 200 upward while retaining the platform 202 in substantially horizontal relation. By reason of the engagement between the rollers 224 and 248 and the cam surfaces of the cam tracks 230 and 254, respectively, such lifting force will elevate the unit 200 to the position shown in dotted lines in FIGURE 4.

Thereafter, continued counterclockise rotation of the reversible motor 62 will cause platform 202 to be rotated in a clockwise direction along the path defined by the portions 234 and 258 of the cam tracks 230 and 254, respectively. Once the cable 276 has reached an essentially vertically extending position, the center of gravity of the unit 200 will be slight to the right of the cable. The reversible motor is then reversed to rotate in a clockwise direction to accommodate full rotational movement of the unit 200 into the position shown in phantom lines in FIGURE 4. The procedure is reversed to return the unit 200 from the phantom position to the solid position of FIGURE 4, the momentum of the unit 200 carrying the center of gravity of the unit past the point of vertical alignment with the pulley 275.

Reference is now made to FIGURE 6 which depicts fragmentarily and schematically a third presently preferred embodiment of this invention. The lift unit here, generally designated 300, is mounted upon a conventional semi-trailer or truck trailer the parts of which are identified with numerals corresponding to those used in FIGURE 1.

Briefly, the lift unit 300 includes a freight-receiving platform 302 and a pair of rigid frames, generally designated 304, one frame being disposed at each lateral edge of the platform 302. Preferably each rigid frame is welded to the platform. The rigid frame 304 comprises a diagonal strut 308, a pair of vertically extending struts 310 and 312 and a horizontal strut 314, all being non-rotatably, rigidly secured together preferably by welding, as previously described with respect to the foregoing embodiment.

The vertical strut 312, non-rotatably carries an adjustable short shaft 316, preferably by threaded connection at 318, which shaft rotatably carries a roller or cam follower 317 (similar to those previously described).

Likewise, the essentially horizontally extending strut 314 non-rotatably carries an adjustable short shaft 320, preferably by threaded connection at 323, which shaft rotatably carries a cam follower 321 at its outside end, in accordance with and conforming generally to the previously described rollers or cam followers.

A pair of cam tracks 324 and 326 are utilized to completely define the path followed by the lift unit 300 as it traverses between the ground engaging position (shown in solid lines in FIGURE 6), the elevate position having the approximate elevation of the trailer floor 16 and being immediately behind the trailer (not shown in FIGURE 6) and the position located entirely within the trailer 12 (shown in dotted lines in FIGURE 6). Cam tracks 324 and 326 may be mounted directly against the sidewalls of the trailer in rigid relation or they may be recessed into the sidewalls.

The cam tracks 324 and 326 respectively comprise vertically extending portions 330 and 332 and horizontally extending portions 334 and 336. A drive apparatus (not shown) structurally and operationally similar to that of FIGURE 4 is utilized to displace the unit 300 between the three previously described positions by manipulation of a cable 340. The cable 340 passes about a pulley 342 secured rotatably upon a shaft 344, which shaft is non-rotatably carried by the trailer, in any suitable way. The cable 340 is rigidly secured in any suitable way at 346 to the vertically extending strut 312 of the lift unit 300.

Thus, the movement of the lift elevator 300 will first be directly vertically and thereafter directly horizontally, freight weight being transferred by the rollers 317 and 321 to the cam tracks 324 and 326 when the rollers are located upon the horizontal portions 334 and 336 of the cam tracks.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle including a body having a floor, a pair of spaced side walls extending above said floor and a roof joining the upper edges of said side walls, said floor, side walls and roof having rear edges terminating in a substantially vertical plane to define a freight hauling space within said body, ground engaging means supporting said body above the ground, and a power lift elevator unit for transferring freight into and out of said space, the improvement of said elevator unit including a horizontal platform, a substantially vertical frame supporting said platform, a pair of guides respectively carried by the side walls inside said hauling space, follower means carried on said frame and received in said guides, said guides each having a first portion angularly disposed with respect to the upper surface of said floor to define a vertical component for guiding said platform to a height at least equal to the height of said floor above the ground and a second portion angularly related to said first portion and into which the frame follower means is received when the platform is above the floor to move the platform within the confines of said space and means for moving the frame follower means along said guides.

2. A vehicle as defined in claim 1, the further improvement of a second pair of guides respectively carried by the side walls inside said hauling space and spaced from the first pair of guides, second follower means carried on said frame and received in said second guides, said second pair of guides each having portions corresponding to the first and second portions of the first guides.

3. A vehicle as defined in claim 2, in which said first portions of the guides define a vertical path for maintaining the platform horizontal while being guided to the level of the floor above the ground and said second portions of said guides are arcuate for guiding said platform from the horizontal position at the level of the floor to a vertical position providing an end closure for said space.

4. A vehicle as defined in claim 2, in which said first and second portions of said guides define rectilinear paths to maintain said platform in a horizontal position while being moved from a ground position to a position within the confines of said space.

References Cited

UNITED STATES PATENTS

| | | | |
|---|---|---|---|
| Re. 23,546 | 9/1952 | Dempster | 214—75 |
| 3,002,719 | 10/1961 | Weiland et al. | 214—75 X |
| 3,051,335 | 8/1962 | Bartlett | 214—75 |
| 3,211,307 | 10/1965 | Neaverson et al. | 214—75 |

ROBERT G. SHERIDAN, *Primary Examiner.*

GERALD M. FORLENZA, *Examiner.*